Feb. 6, 1962 W. A. ADCOCK ETAL 3,020,128
METHOD OF PREPARING MATERIALS OF HIGH PURITY
Filed Dec. 31, 1957 7 Sheets-Sheet 4

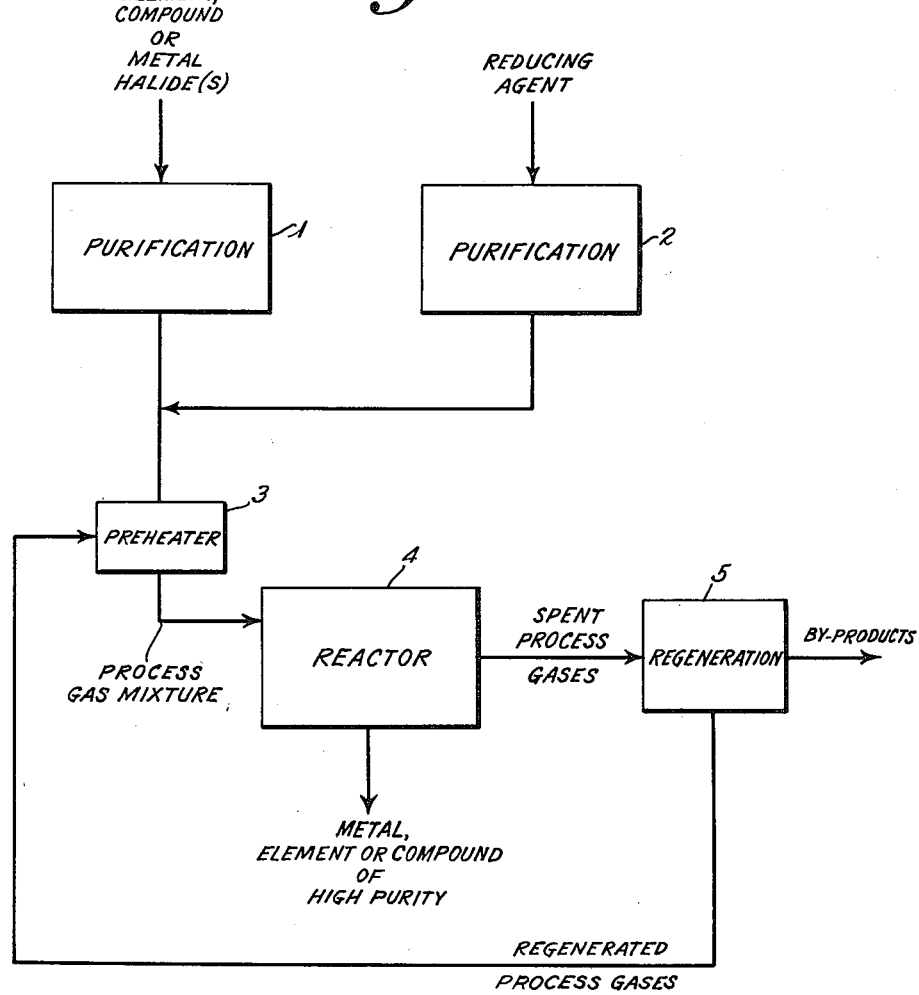

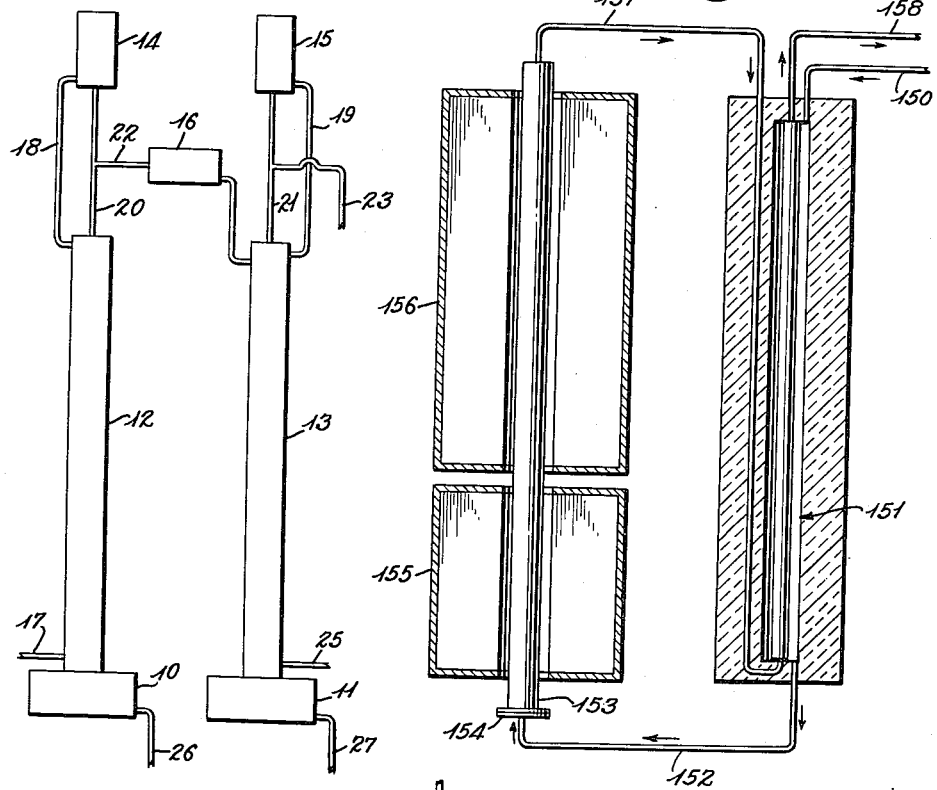

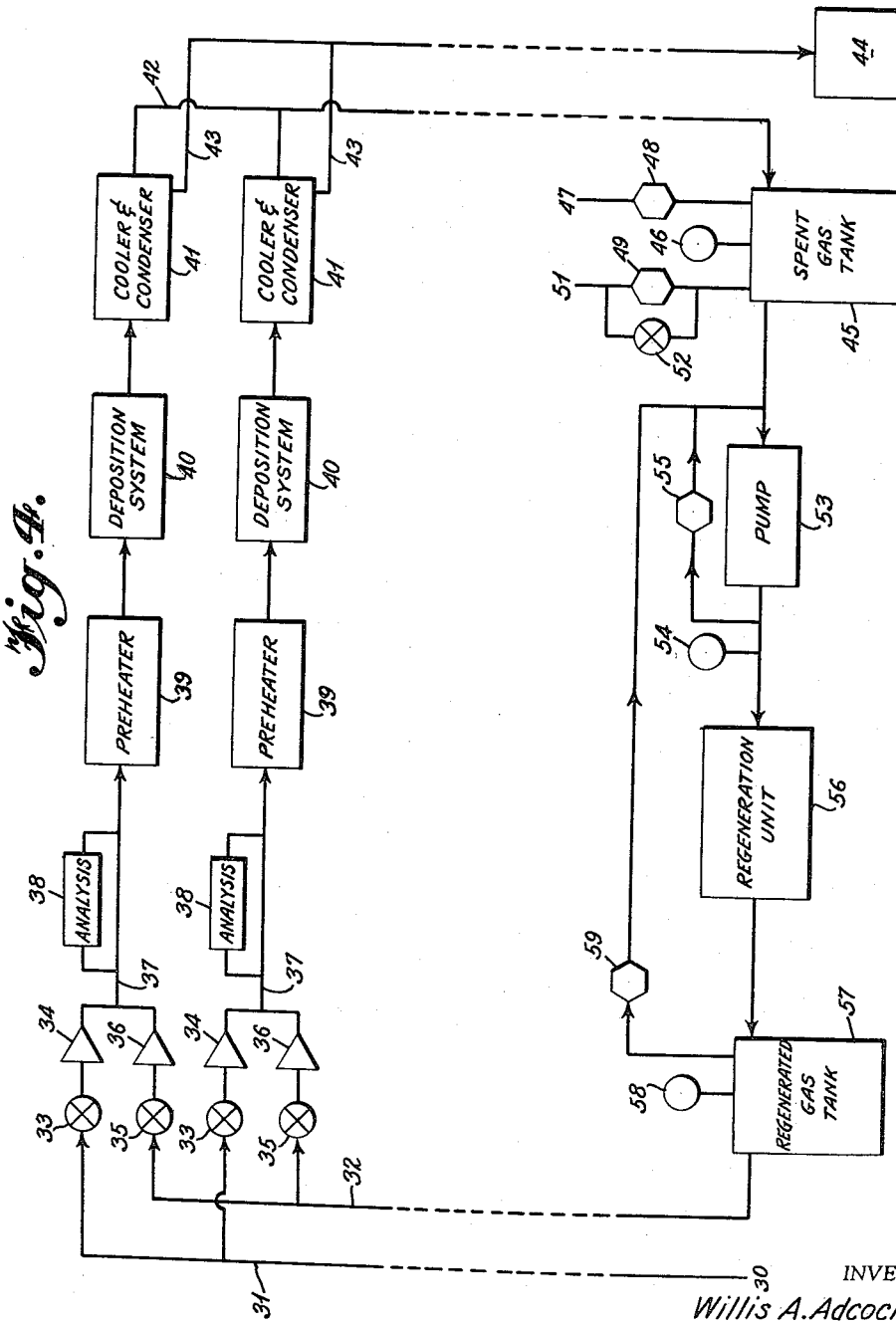

INVENTORS
Willis A. Adcock and
Raymond C. Sangster
BY Stevens, Davis, Miller & Mosher
ATTORNEYS

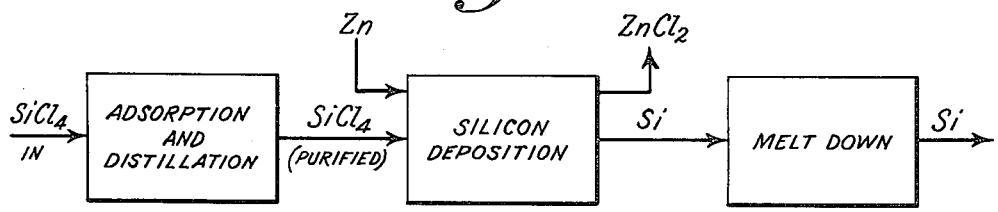
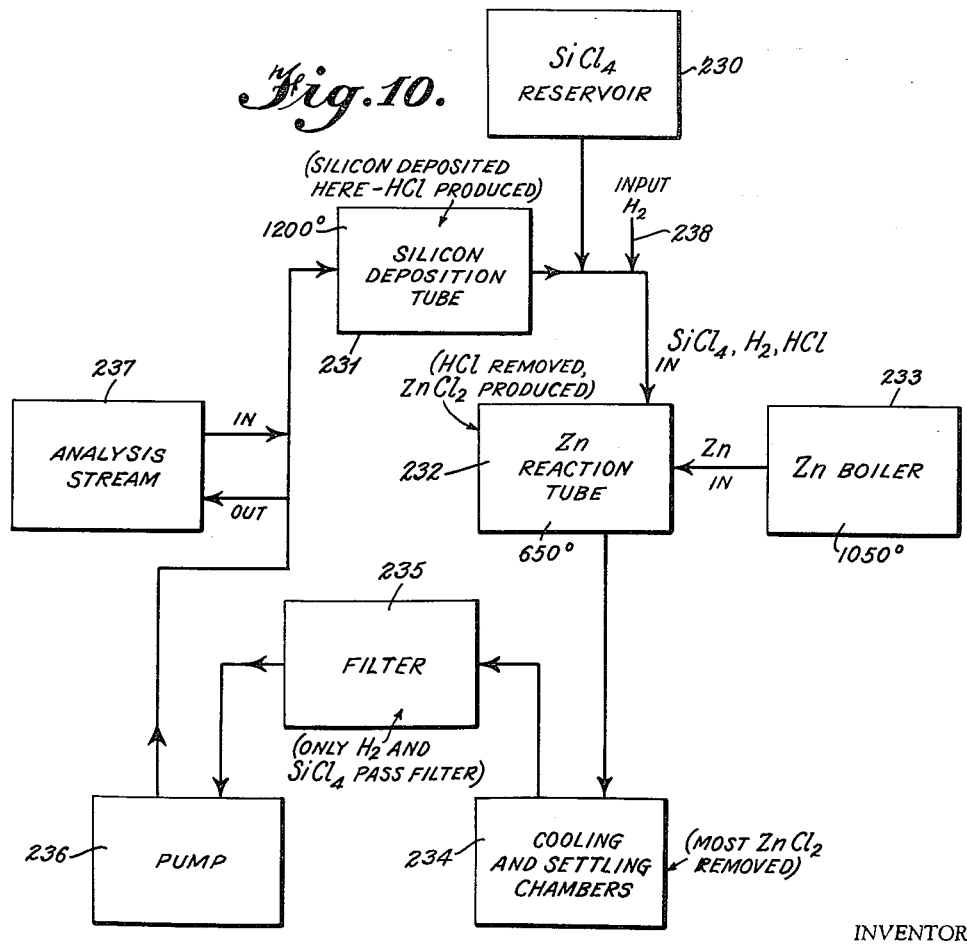

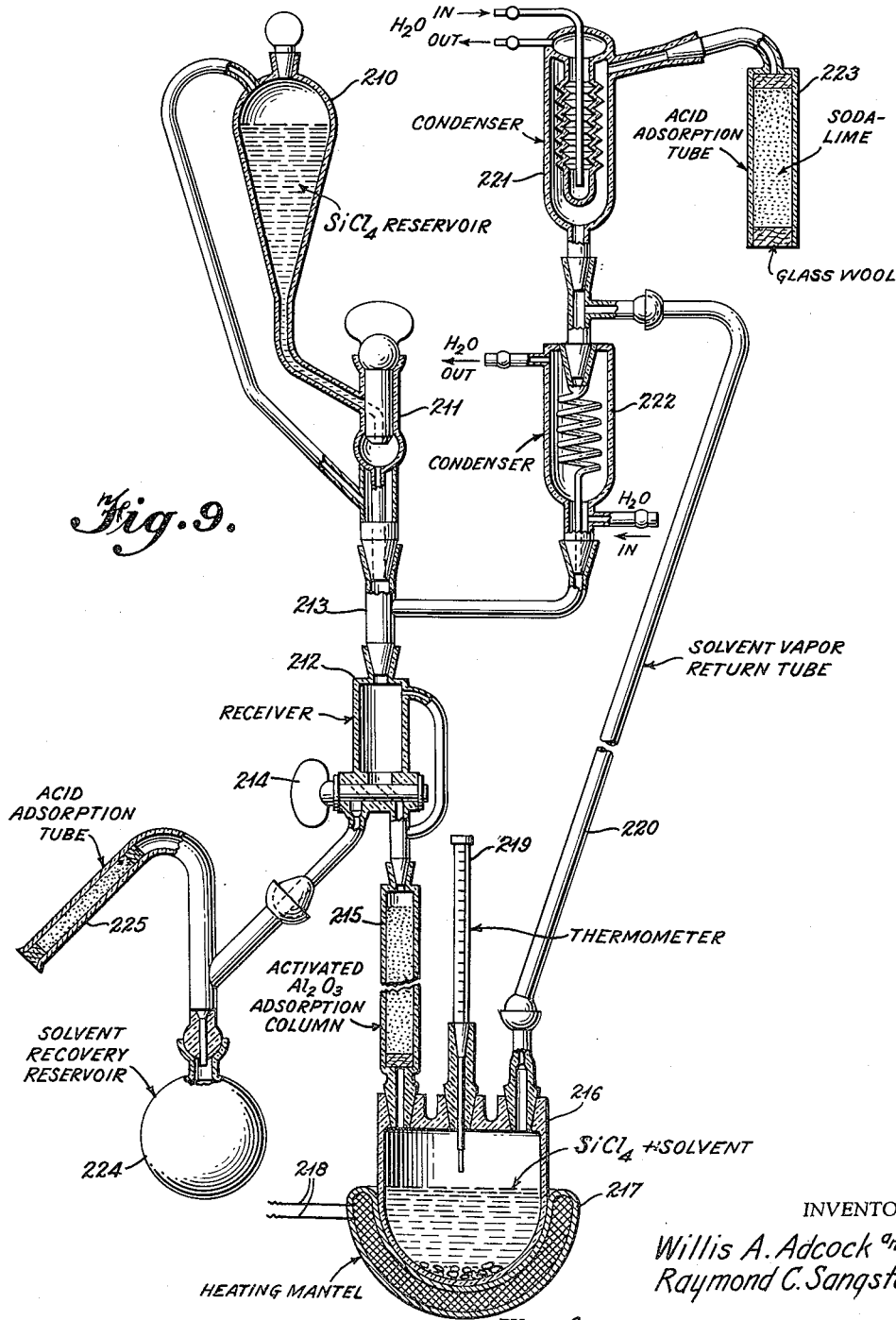

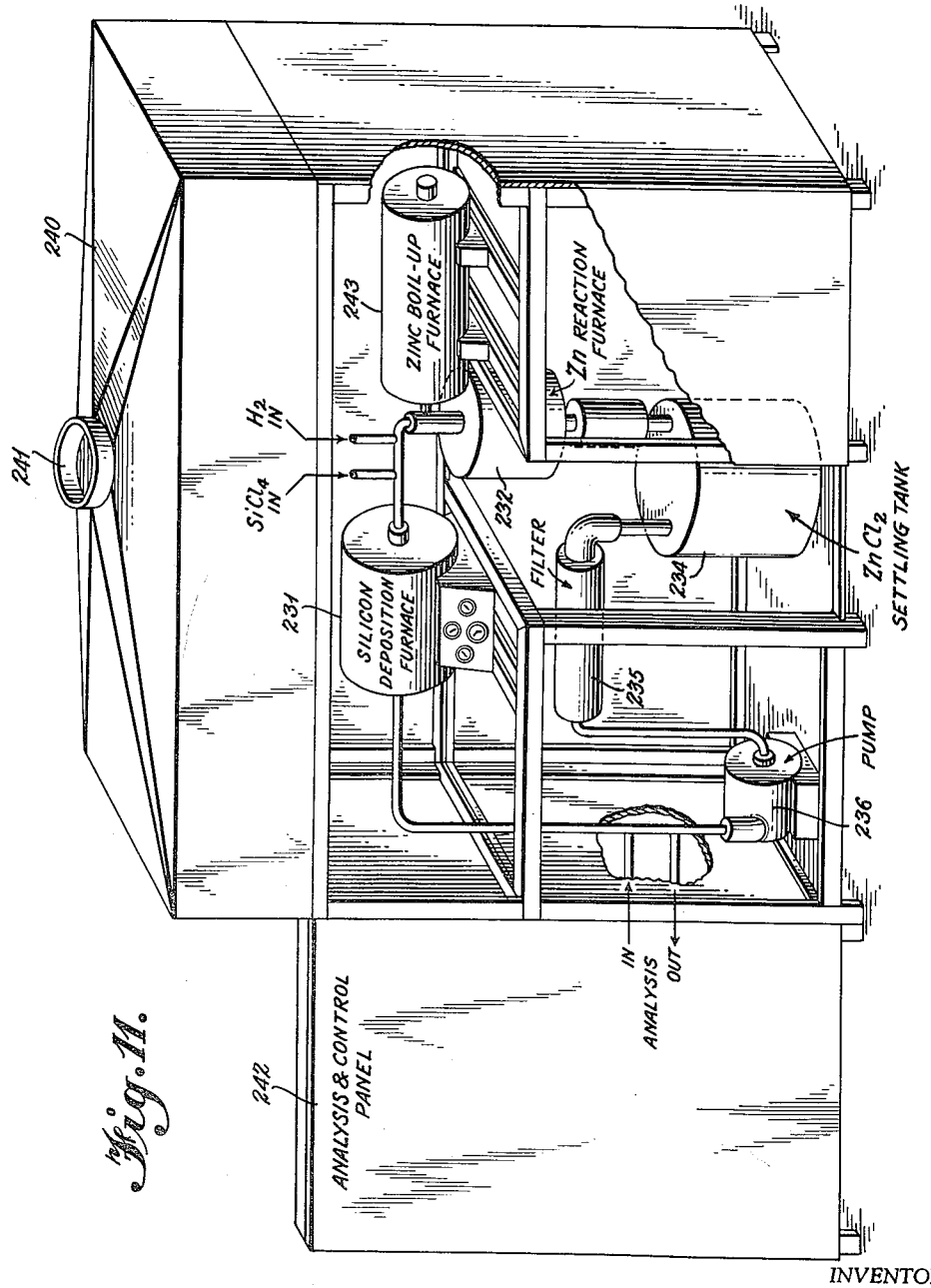

United States Patent Office 3,020,128
Patented Feb. 6, 1962

---

3,020,128
METHOD OF PREPARING MATERIALS
OF HIGH PURITY
Willis A. Adcock and Raymond C. Sangster, Dallas, Tex., assignors to Texas Instruments Incorporated, Dallas, Tex., a corporation of Delaware
Filed Dec. 31, 1957, Ser. No. 706,494
10 Claims. (Cl. 23—223.5)

The present invention relates to a process for the production of extremely high purity materials, which involves the reaction of highly purified halides of the elements in question with a highly purified reducing gas like hydrogen. More particularly, the process involves reacting a gaseous mixture of the halides and hydrogen at or on suitable hot, non-reactive surfaces, followed by regeneration of the reaction mixture by the selective reduction and/or removal therefrom of the secondary products of the reaction and recycling the regenerated gaseous mixture into the reaction process. This invention relates generally to the production of highly purified materials for use in the production of electrical semiconductor devices, and for other purposes such as the starting materials for preparing the so called intermetallic compound semiconductors and other useful compounds and materials. However, this invention relates more specifically to the production of highly purified silicon, especially useful in the production of electrical semiconductor devices and, as such, constitutes a continuation-in-part of copending application, Serial No. 514,862, filed June 13, 1955, now abandoned.

The process of the present invention was developed primarily for the production of elemental silicon of the extremely high purity necessary for use as the starting material in the manufacture of silicon semiconductor devices. However, the process, without departing from the scope of the invention, can also be used to produce other materials of high purity, such as phosphorus, arsenic, antimony, bismuth, germanium, tin, lead, boron, aluminum, gallium, indium, thallium, zinc, titanium, zirconium, hafnium, beryllium, magnesium, calcium, vanadium, tantalum, thorium, uranium, tungsten, copper, silver, gold, and niobium (columbium), or any other element, that can be prepared in the form of a volatilizable halide which can be reduced with hydrogen (or other gaseous reducing agent). It can also be used to produce compounds, such as silicon carbide of extremely high purity.

The extensive use of silicon in electrical semiconductor devices has necessitated the production of relatively large quantities of ultra pure silicon. Impurities, even in the amount of one part in one hundred million, are highly undesirable, and this makes it necessary to use lengthy, tedious and costly silicon purification processes. The common method of reducing silicon tetrachloride ($SiCl_4$) with zinc yields a product which leaves much to be desired in the way of purity. Ordinarily, this product requires extensive further treatment to remove all traces of zinc and other impurities that may be present in either the silicon tetrachloride or the zinc.

It is also known in the prior art to produce silicon on a heated filament by reducing silicon tetrachloride with hydrogen in a "straight through" or single pass of the silicon tetrachloride and hydrogen through the deposition zone. However, even at a temperature of 1150° C., and using a gaseous silicon tetrachloride to hydrogen ratio by volume of 0.0685, only 12% of the silicon tetrachloride is converted to silicon under equilibrium conditions. As a result, only 1.6 percent of the available hydrogen is used, and a pound of silicon requires the use of 1636 cubic feet of hydrogen and 50.4 pounds of silicon tetrachloride. In addition to the initial cost of the materials, there is a serious problem of purifying the materials to begin with in order that appreciable quantities of impurities will not carry over into the silicon product.

Silicon tetrachloride reacts fairly incompletely with hydrogen under economically feasible reaction conditions and, thus, use of another halide of silicon that reacts more completely for the same or equivalent silicon deposition rates is quite desirable. Trichlorosilane ($SiHCl_3$) has been found to be such a compound. At 1150° C., with a trichlorosilane to hydrogen ratio by volume of 0.0685, 28% of the trichlorosilane is converted to silicon under equilibrium conditions. Further, with a trichlorosilane to hydrogen ratio of 0.040, 39.5% of the trichlorosilane is converted to silicon and with a ratio thereof of 0.010, about 80% of the trichlorosilane is converted to silicon. Trichlorosilane is a commercially available commodity.

Accordingly, in the preferred embodiment of the present invention, there is provided an integrated process in which ordinary commercial grade trichlorosilane is converted into ultra high purity silicon, efficiently, and by the use of other chemicals all of which are of ordinary commercial quality. The silicon is recovered in a state of ultra high purity and requires no further independent treatments to make it usable in the production of crystals suitable for making electrical semiconductor devices.

The above is not intended to imply that silicon tetrachloride is not a desirable material to use in the production of high purity silicon. Thus, in accordance with another particular embodiment of the present invention, there is provided an integrated process in which ordinary reagent quality silicon tetrachloride may be converted into ultra high purity silicon, efficiently, and by the use of other chemicals of ordinary reagent quality.

Accordingly, it is an object of the present invention to provide a novel and useful process for the recovery of an element or compound in extremely high purity form, which process can be operated efficiently and economically.

It is another object of this invention to provide, in a process for producing an element in highly purified form, for the selective removal from a gaseous mixture of the by-product gas resulting from the reaction between a gaseous halide of the element and a reducing gas.

It is a further object of this invention to provide, in a process for producing a highly purified element, for the regeneration of a gaseous mixture comprising a gaseous halide of the element, a reducing gas, and a by-product reducing gas-halide gas, the regeneration being accomplished by the selective reduction of the by-product gas to the reducing gas and a metal halide and the removal of the metal halide from the gaseous mixture.

It is a still further object of this invention to provide a process for producing an element in highly purified form by reacting on a heated surface a gaseous halide of the element and a reducing gas and regenerating the gaseous halide of the element and reducing gas not used in the reaction by the selective removal and/or reduction of the by-product gas of the reaction.

It is still another object of this invention to provide an ultra pure element by a process involving the reaction of a gaseous mixture of the halide of the element and hydrogen at or on suitable hot non-reactive surfaces, followed by the regeneration of the gaseous mixture by the selective reduction and/or removal therefrom of the secondary products of the reaction, and recycling the regenerated gaseous mixture.

A more specific object of this invention is to provide a process involving the reaction of a gaseous mixture of trichlorosilane and hydrogen at or on a suitable hot non-reactive surface, followed by regeneration of the gaseous mixture by the selective reduction and/or removal therefrom of the secondary products of the reaction, i.e. hydrogen chloride, and recycling the regenerated trichlorosilane and hydrogen gaseous mixture.

Another specific object of this invention is to provide a process involving the reaction of a gaseous mixture of silicon tetrachloride and hydrogen at or on a suitable hot, non-reactive surface, followed by regeneration of the gaseous mixture by the selective reduction and/or removal therefrom of the secondary products of the reaction, i.e. hydrogen chloride, and recycling the regenerated silicon tetrachloride and hydrogen gaseous mixture.

It is another object of this invention to provide a process wherein the gases used in the production of an element in highly purified form are purified prior to the reaction therebetween yielding the element.

Other and further objects of the invention will become more readily apparent as the ensuing description unfolds.

In the drawings:

FIGURE 1 is a diagrammatic illustration of the process of the present invention;

FIGURE 2 is a schematic illustration of a purification step by distillation according to one step of the process of the invention;

FIGURE 3 illustrates schematically a titanium or zirconium purification system for hydrogen;

FIGURE 4 illustrates schematically a silicon deposition system according to the process of the invention;

FIGURE 7 illustrates schematically a molecular sieve adsorption system;

FIGURE 8 is a flow diagram of a particular embodiment of this invention;

FIGURE 9 is a diagrammatic illustration of the adsorption step of the embodiment of FIGURE 8;

FIGURE 10 is a flow diagram of the silicon deposition step of the embodiment of FIGURE 8; and FIGURE 11 is a diagrammatic illustration of an apparatus for accomplishing the silicon deposition step of the embodiment of FIGURE 8.

Figure 5:
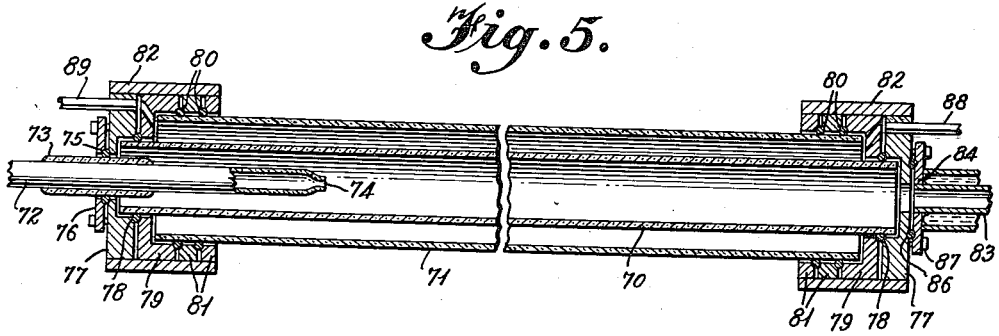
FIGURE 5 illustrates schematically a silicon deposition unit.

Basically, the complete process of this invention can be divided into four main parts: (1) purification of the halide or halides of the element to be reduced; (2) purification of the reducing gas, hydrogen; (3) reaction of the halide or halides with hydrogen in the presence of a hot, non-reactive surface, regeneration of the reaction mixture, and recycling; and (4) recovery of the element from the deposit on the non-reactive surface. The details given below apply specifically to the production of high purity silicon, but the procedure can also be applied to the elements listed above with but slight modification, in many cases, of the design of the process equipment.

There now follows a brief résumé of the steps of the process.

*(1) Purification of the halide*

In the particular case of silicon, trichlorosilane is the preferred halide of silicon for use in the process. Trichlorosilane of 96–98% purity is commercially available and may be sufficiently purified by fractional distillation. The details of the distillation process will be given in a separate description below. Halides of silicon other than trichlorosilane may also be used, for example, to mention only a few, the tetrachloride, the tetrabromide and the tetraiodide. For these and other materials, various methods of purification, such as liquid-liquid extraction, zone refining, sublimation, recrystallization from suitable solvents, and chromatographic purification, may be used in addition to or in place of distillation techniques. However, fractional distillation in many cases is adequate by itself and is the most economical and effective single purification technique.

*(2) Purification of the hydrogen*

Since a large excess of hydrogen is present during the reaction, it is particularly necessary to purify the hydrogen very carefully before introduction into the process stream. Briefly, commercial electrolytic hydrogen of 99.7% purity is essentially freed from oxygen and water by first passing it through a catalytic unit which converts the oxygen to water, and then through a drying column to remove the water. Residual water and oxygen concentrations up to about 50 p.p.m. are tolerable. Further purification may be obtained by passing the hydrogen over hot titanium chips but this is normally not necessary. Details of this step will be given in a later section in this description.

*(3) Reaction, regeneration, and recycling*

The gaseous anhydrous mixture of trichlorosilane (or other volatile halide of silicon) and hydrogen is preheated and then passed through a deposition unit where the halide reacts with the hydrogen, depositing silicon on a heated surface. The excess trichlorosilane, hydrogen, and any by-products (in this case, primarily hydrogen chloride and volatile silicon hydride-chlorides) pass on through to the cooler and condenser, where any high boiling components are condensed out. The remaining mixture, that is, excess trichlorosilane, excess hydrogen, by-product silicon hydride-chlorides, and by-product hydrogen chloride, passes into a storage vessel from which it is pumped to the regeneration system by a Corblin diaphragm compressor or other similar type gas pump. Here, the hydrogen halide by-product is selectively removed such as by adsorption on so-called molecular sieve or similar adsorbent or by reaction with zinc vapor. The mixture then enters another storage vessel from which it can once again be passed through the preheater and deposition unit after the addition of hydrogen and/or halide to bring the mixture back to the desired silicon halide concentration. Further details about the deposition units and regeneration system will be given in a separate section of this description. The above description is in terms of silicon but others of the elements indicated above can be produced by appropriate selection of the halide of the element for use in the process.

*(4) Recovery of the deposited material*

In the case of silicon, where a quartz deposition tube is used, the quartz may be easily removed from the deposited silicon by reaction with reagent grade hydrofluoric acid. For the preparation of other elements, various other materials may be used for the deposition tube (reaction surface) and different procedures used for recovering the deposit from the tube. In some cases, where the forces of adhesion between the deposit and the tube are relatively weak, it may be possible to crack the tube away from the deposit, or suitable reagents may be used to dissolve the tube away from the deposit. In some instances, it may be possible to remove the deposit without damaging the tube.

Having presented above in general terms the main process steps of this invention and a brief résumé of each step, there now follows a detailed description of the particular embodiments thereof which have been found to be of value in the production of high purity semiconductor grade silicon.

The first and preferred process embodiment for producing high purity silicon involves the following particular operations: (1) The purification of trichlorosilane (SiHCl$_3$). (2) The purification of hydrogen. (3) The reaction of the trichlorosilane with the hydrogen in a system which involves the following steps: (*a*) the generation of a suitable gaseous reaction mixture; (b) pre-heating of this gaseous mixture to a temperature just below the reaction temperature before introducing it into the deposition unit (this pre-heating step is desirable but not essential to the process); (*c*) carrying-out of the reaction at a hot quartz surface in a suitable deposition unit; (d) cooling of the spent process gases to remove any high-boiling by-products that might condense out later and cause trouble if not removed; (e) recovery of the spent process gases; (f) pumping of the gases back to a high pressure to drive them through the system again; (g) regeneration of the spent gases by the selective removal of the by-product hydrogen chloride with the so-called Linde molecular sieves; (h) storage of the regenerated process gas mixture under relatively high pressure; and (i) recycling of the regenerated gases back into the process with additional hydrogen and/or trichlorosilane being added to maintain the desired process gas volume and composition. (4) The recovery of the product silicon from the quartz deposition tube.

A very general flow diagram of the process of the present invention is set forth in FIGURE 1. As has been indicated, the process in its broadest aspect contemplates a purification step 1 for the metal or other halides involved and a purification step 2 for the reducing agent. Thereafter, a gaseous mixture is formed, preheated by preheater 3 and introduced into a reactor 4. The metal, element, or compound sought is deposited in the reactor 4. Spent process gases pass to a regeneration step 5 and regenerated process gases are returned to the preheater 3 and reactor 4.

In the first step of the process, purification of trichlorosilane by careful distillation has been found a satisfactory technique. The distillation phase of the operation is schematically illustrated in FIGURE 2. Crude trichlorosilane is introduced at point 17 near the bottom of a first distillation column 12 by a pressure feed system from pressure tanks not shown. The material is vaporized in still pot 10, the vapor at the top of the column 12 escaping through line 18 into refrigerated condenser 14 where it is condensed. The major portion of the condensate is returned through line 20 to column 12. A portion, however, is diverted through valves and flow meters (not shown) into intermediate accumulator tank 16. This material contains all of the low-boiling contaminants present in the feed material, but none of the high-boiling ones. The material from the intermediate accumulator tank 16 is fed through valves and flow meters (not shown) into a second distillation column 13 near the top. The material in this column is vaporized in still pot 11, the vapor escaping through vapor line 19 into refrigerated condenser 15, where it is condensed. The major portion is returned to the top of the column by return line 21. Part, however (e.g., perhaps 5% of the throughput) is diverted through a valve and take-off system (not shown) through line 23 to a waste drum and waste disposal system (not shown). All of the low boiling contaminants are removed in this waste stream. The highly purified product is recovered at point 25, by means of a valve and flow meter system (not shown). The high boiling impurities separated out by the first column are accumulated in the still pot 10 and are removed via waste line 26 into a valve and waste disposal system (not shown). The waste stream out of the still pot 10 consists of perhaps 15% of the throughput. A waste stream (perhaps 5% of the throughput) is also removed through line 27 from still pot 11 to insure that impurities do not accumulate in the pot 11.

The purified trichlorosilane from line 25 in FIGURE 1 is collected in tanks (not shown), for example, glass or stainless steel. The stainless steel tanks normally used are plumbed to allow transfer of material from tank to tank, or back to the feed tanks, or to waste drums. Provision is made for flushing them with helium or hydrogen, as desired. Also, appropriate valve connections are made so that hydrogen under pressure can be forced to bubble through the liquid trichlorosilane in the tanks. The gaseous mixture of hydrogen and trichlorosilane present above the liquid trichlorosilane is then bled off and introduced into the silicon production process.

The hydrogen to be used in the process must also be purified carefully. This is accomplished by passing it through a catalytic oxygen-removing unit, such as those marketed under the trade names "Hydropure" or "Deoxo," and then through an appropriate drying unit to remove water. "Linde type '4A' or '5A' molecular sieves" may be used for this purpose, or units of the "Lectrodryer" type using activated alumina or other desiccants. The next step is filtration through a porous stainless steel or other type filter to remove any solids suspended in the gas.

FIGURE 3 illustrates schematically a titanium or zirconium system suitable for the final, or as an alternative to the above, purification treatment of the hydrogen prior to its introduction into the liquid trichlorosilane in the collecting tanks. In this case, the purification of hydrogen is achieved by passing the impure hydrogen over hot titanium or zirconium chips. The prepurified hydrogen, or raw hydrogen as the case may be, enters the system via line 150, passing first into the heat exchanger system 151, which is shown only schematically, but which may be fabricated from stainless steel pipe and tubing and surrounded by insulating material. The heat exchanger 151 serves as a pre-heater for the hydrogen. The preheated hydrogen then leaves the heat exchanger 151 through line 152 and enters the titanium furnace tube 153. This tube may be constructed of types 316, 321, or 347 stainless steel. A flanged end and end-plate 154 are provided for filling and emptying the tube. The tube is charged with titanium or zirconium chips or shavings, for example, the scrap from machining operations. It is heated by the furnaces 155 and 156. A two furnace heating system is used so that initial hydrogen heating power can be concentrated at the input end of the furnace tube where the incoming gas must be heated up to or nearly to, the reaction temperature rapidly. The hot gas escapes by way of the line 157 and passes through the heat exchanger 151, giving up most of its heat therein, and finally emerges through line 158. The purified gas may retain enough residual heat that additional water cooling is desirable.

The titanium or zirconium chips used in this process must be carefully degreased and dried before use. The purification system must be well flushed with helium before being brought up to temperature, which heating also must be done with helium present therein. When the titanium or zirconium is at the operating temperature, in the range from 750-900° C., hydrogen can be bled in slowly. The titanium or zirconium reacts quite vigorously with the hydrogen, so that it is necessary to control the initial rate of addition of the hydrogen to prevent an excessive rise in temperature. In another operating mode, because of this rise in temperature, the hydrogen can be added into furnace tube 153 at a lower temperature in starting up—perhaps 600-750° C.—and the furnaces 155 and 156 then brought up to the operating temperature.

The stainless steel tube system is satisfactory for use up to 900° C. Above 1000° C., though, failure of the stainless steel can occur due to the formation of a relatively low melting liquid alloy with the titanium.

If a horizontal titanium or zirconium tube system is used, or if the titanium or zirconium can be obtained in the form of springy shavings, quartz or Vycor furnace tubes can be used. These tubes cannot be used, however, in the vertical position with massive chips, since the chips expand upon reaction with the hydrogen and crack the tubes.

Except for the noble gases (helium, neon, argon, and the like) it is expected thermodynamically, that the hot titanium (or zirconium) or titanium (or zirconium) hydride will react with almost any impurity in the hydrogen such as oxygen, water, nitrogen, carbon monoxide or dioxide, hydrocarbons, etc., to yield titanium or zirconium oxides, nitrides, and carbides. Titanium has been shown to be effective for oxygen, water, and nitrogen.

Furthermore, it offers the only known means of efficiently purifying hydrogen on a large scale to remove the trace of nitrogen that is always present in raw hydrogen.

The system used in the deposition of semiconductor grade silicon is shown in FIG. 4. The primary process gas, referred to herein as the spent process gases which have been recovered, regenerated and recycled, is introduced into individual deposition lines from manifold 32 through valves 35 and flowmeters 36. Any convenient number of deposition lines may be used, say 2 to 12. The initial gaseous mixture to charge the system and the makeup process gas stream, designated herein as the secondary process gas, is introduced from a suitable source 30 (not shown in detail) into manifold 31 and thence through valves 33 and flowmeters 34 into the individual deposition lines. The source 30 will normally be the gas mixture present above the trichlorosilane in the collection tanks, referred to above, when hydrogen is being allowed to bubble through the tanks. In all cases this gas will consist of a mixture of hydrogen and gaseous trichlorosilane. Since trichlorosilane boils at 32° C., it is not difficult to produce a gas stream quite rich in trichlorosilane. For other materials than silicon, or with other starting silicon halides, where the halides used are less volatile, modifications to this system may be necessary.

The two process gas streams meet and mix in lines 37. Filtration (not shown) at this point through porous stainless steel filters may be desirable to remove any suspended solids present due to reactions taking place when the gas streams meet (such as hydrolysis of the trichlorosilane by any residual moisture in the hydrogen) or to any other cause. A portion of the gas is diverted to an analysis system 38 for determination of the process gas stream composition. Thermal conductivity measurements have proved to be a very useful and effective means of analyzing these hydrogen-rich mixtures. Other techniques such as infra-red absorption measurements may also be used.

The process gas with the proper concentration and the proper flow rate then enters preheating units 39. Proper concentrations of process gas have been obtained within the ranges of 2–6% trtichlorosilane and 98–94% hydrogen present in the gaseous mixture and proper flow rates have been found to be within the range of 2.5–5.0 s.c.f.m. (standard cubic feet per minute). Units 39 consist of 25 mm. I.D. quartz tubes filled with loosely packed quartz fragments, surrounded by a tube furnace 12 inches long. Preheating temperatures in the range 750–900° C. have been found most effective. Preheating is desirable to avoid the use of an excessive length in the deposition tube for the purpose only of heating the process gases to reaction temperature.

From the preheater, the gas enters deposition system 40. The deposition systems will be discussed in more detail below. Reaction takes place in these units at temperatures in the range of 1100–1300° C.

The spent process gases then escape into cooling and condensing systems 41. These systems in the present embodiment consist of an air cooled Vycor tube some 38 mm. in diameter and 80 cm. long, which discharges into a water cooled condenser unit. The water to the condenser unit is refrigerated below room temperature. A small yield, perhaps 2% of the total amount of silicon containing compounds, of high boiling by-products condenses out, in part in the form of a fog. The gas-fog mixture is then passed through a glass wool bed to strip out all of the condensed liquids. The spent process gases escaping from the liquid removing units are now free from any components that might condense out elsewhere in apparatus at room temperature. The stripped spent process gases enter manifold system 42, while the condensed liquids are recovered through manifold 43 and collected in drum 44.

The spent process gases are now piped to and collected in tank 45. This tank is the low pressure point of the system, since it is desirable to keep the pressure in the deposition system 40 as near atmospheric pressure as possible, to prevent undue stresses on the hot quartz tubes. For safety reasons, namely, so that leaks will be out and not in thereby to prevent explosive mixtures from being formed with the hydrogen present in the system, the pressure everywhere in the system must always be kept above atmospheric pressure. To control the pressure at the desired level, pressure switches in pressure sensing unit 46 and two solenoid controlled valves, 48 or 49, are used, respectively, to add pure hydrogen from source 47 to compensate for any decreases in pressure, or to bleed off any excess gases to waste line 51 to reduce the pressure to the predetermined amount. In addition, bypass valve 52 is provided to make possible a continuous slight bleed-off of the process gas, to prevent impurities from accumulating therein to any undue extent. Flow metering, analysis, and other equipment may be provided in this general area, but are not necessary in the process of this invention.

The gas from tank 45 is then pumped by pump 53 (which is preferably a Corbin diaphragm compressor) into regeneration unit 56, which will be described in more detail below, and thence into regenerated gas tank 57. Pressure switches, 54 and 58, are provided to control the pump operation and the head pressures obtained. They may function either by controlling by-pass solenoid valves 55 and 59 in lines leading back to the input of pump 53 or by affecting directly the pumping rate of pump 53.

From the regenerated gas tank 57 the regenerated process gases return via the manifold line 32 to the deposition portion of the equipment to complete the cycle.

Figure 6:
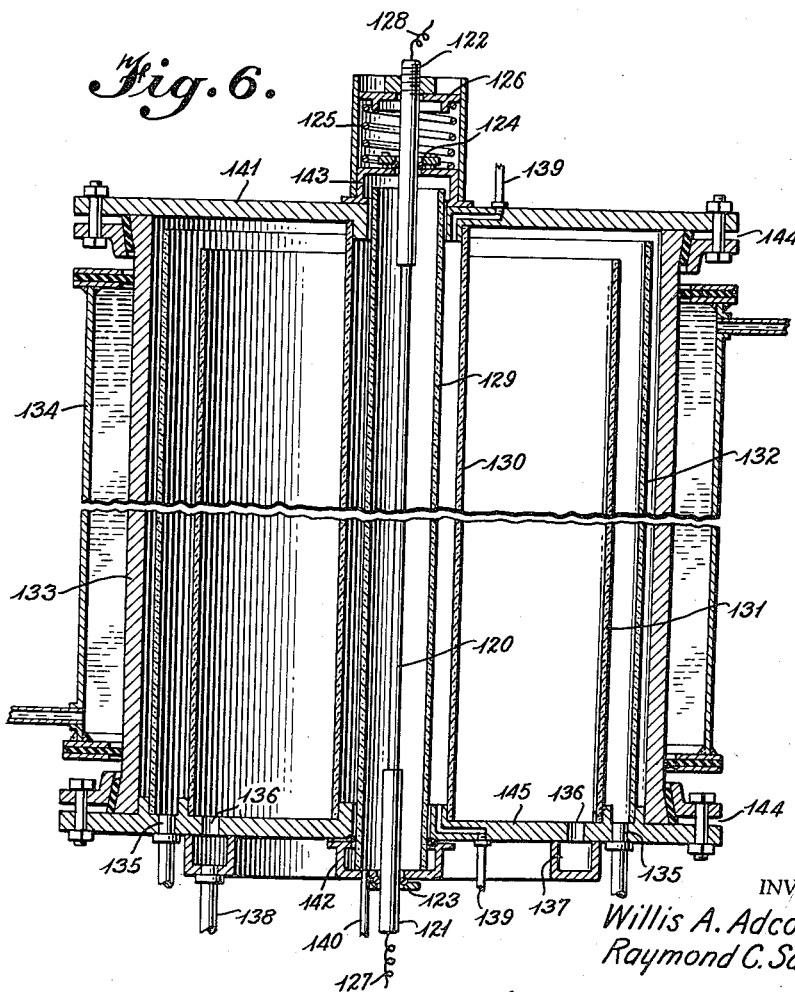
FIGURE 6 illustrates schematically an alternative silicon deposition unit.

Two versions of double tube deposition units are shown in FIGURES 5 and 6. In FIGURE 5 the tubes are heated externally, by a silicon carbide rod or other type high temperature resistance heating element. In FIGURE 6, the tubes are heated by an internal heating element.

In FIGURE 5, inner tube 70 preferably of quartz, provides the surface on which the deposition of the silicon (or other material) takes place. Quartz tubes are particularly useful for the deposition of silicon, since with high purity quartz, the chance of contamination from the deposition surface is minimized. In the case of other elements, such as niobium, refractory tubes of the metal oxides are not available and experience and experiment will have to indicate the best compromise among the available materials. However, in general, non-metallic surfaces should be used to avoid alloying and contamination of the deposit. Metallic surfaces are permissible in general only when such surfaces consist of the element to be prepared or when special reasons predict no contamination problems will arise from the use thereof.

Outer tube 71 of FIGURE 5 is provided for several reasons. The essential one is to provide structural strength to the whole assembly. After silicon has been deposited on a quartz tube 70, it is usually impossible to cool the tube more than a few hundred degrees centigrade without having both the tube and silicon deposit shatter. (The deposit adheres very tenaciously to the quartz surface, and since both materials are quite brittle, the strains due to the widely different coefficients of thermal expansion cause both materials to shatter when the unit is cooled.) The outer tube 71 is then essential to provide mechanical strength and to provide a suitable non-contaminating container to hold the silicon deposit in the event tube 70 shatters. The annular space between the two tubes is also useful for safety reasons. First, helium, or some other innocuous inert gas, can be introduced through inlet tube 88, and removed through outlet tube 89, to provide an inert gas atmosphere around the deposition tube which contains an explosive gas atmosphere.

The outer tube is sealed from this atmosphere by O-rings 80 and clamping pieces 79, 81, and from the inner tube by O-rings 78 and clamping pieces 77, 79. Those clamping pieces subject to coming in contact with the trichlorosilane-hydrogen mixture are made from stainless steel while the remaining clamping pieces are made from brass. Thus, any failure of the inner tube or any leakage from the inner tube will normally allow the process gases only to mix harmlessly with the inert atmosphere, rather than violently with the air. Second, if a sensitive flowmeter is provided in exhaust line 89, any leakage past O-rings 78 can be detected.

In the present embodiment of the silicon production process, the inner quartz tube is 40–42 mm. I.D. The outer shield tube is of 2 inch bore quartz tubing. All quartz tubing was obtained from the Cleveland Quartz Works and is of the clear fused quartz grade. Translucent quartz and other materials may also be used for the shield tubes.

The process gases enter through quartz tube 72, which is usually sealed onto the preheating tube as a continuous unit. The unheated portion between the preheating furnace and the deposition furnace is insulated as much as feasible to reduce heat losses. The quartz tube 72 enters the deposition tube system via an O-ring seal 75 and clamp 76 to evacuated Dewar-seal-insulated portion 73 of tube 72. The tube extends well into the deposition unit, terminating in a shaped nozzle 74 just outside the beginning (not explicitly shown) of the furnace-heated reaction zone. The shaping of the nozzle is designed to increase the turbulence of the flow of the process gas in the reaction zone and thus to increase the heat transfer to the gas and the effectiveness of the contact of the gas with the hot quartz tube.

The process gases leave the deposition system through water cooled stainless steel tube 83 which is welded into stainless steel end-piece 84. End piece 84 is sealed by means of O-ring 86 and clamp 87 to stainless steel endcap piece 77. Alternatively, an arrangement similar to that at the input end of the deposition system is used when an air-cooled Vycor exit tube is used.

The percent conversion of trichlorosilane to silicon per pass under economically feasible conditions can be varied from 15 up to about 30% with deposition rates up to 90 grams per hour. About two pounds of silicon are recovered per run but this quantity is variable and depends upon the size of the deposition tube.

FIGURE 6 illustrates schematically a double tube internally heated silicon deposition unit. The power for this unit is supplied by resistance element 120. This element is shown as a straight filament or rod, but it could be spiraled or bent into more complicated shapes. It may be a simple unit, or it may consist of resistance wire wound on a refractory base and may be of such materials as graphite, platinum, or tungsten. Preferably, however, it is of a material such as tantalum, or perhaps molybdenum or tungsten, that is relatively unaffected by the process gas in case of accidental leaks. It is clamped into water-cooled (water cooling details not shown) lead end pieces 121, 122. Lower lead piece 121 is clamped in place and sealed into the unit by O-ring seal 123 and any other auxilary apparatus (not shown) as may be necessary. The upper lead enters the unit by O-ring seal 124 and floats in place on spring and guide assembly 125, 126. The floating upper lead serves to keep the heating element taut and to allow for expansion and contraction in that unit. Current is conducted from a power supply (not shown) to and from lead piece 121, rod 120 and lead piece 122 by electrical leads 127, 128, respectively.

Surrounding the central heating element concentrically are the following tubes: Inner quartz shield tube 129, which may be of approximately 25 mm. I.D.; outer quartz deposition tube 130, which may be of approximately 40 mm. I.D.; two quartz preheater tubes 131, 132 which may be approximately 5 inches and 5¾ inches I.D., respectively; water-cooled Pyrex pipe 133, which may be 6 inches I.D., and metal water cooling jacket 134. Any suitable inert metal pipe may be used in place of the 6 inch Pyrex pipe, as for example, water-cooled 316 stainless steel or tantalum clad pipe.

The process gas enters from a suitable manifold system (not shown) through a plurality of openings 135 in bottom base plate 145 into the annular space between the two preheating tubes 131, 132. The gas is heated by radiation or conduction outward from the central heating element. Heat loss can be reduced and preheating of the process gas increased if desired by addition of an (inert) tantalum or other heat reflector between tube 132 and outer pipe 133. The process gas rises upward between tubes 131, 132, escaping at the top of tube 131 into the annular space between that tube and deposition tube 130. The surface of the tube 130, or of the deposit produced on it, is maintained at a temperature adequate to promote deposition of silicon from the process gas surrounding it. The process gas then passes downward to a plurality of escape ports 136 leading into watercooled (cooling means not shown) manifold 137, and thence out through exit tube 138 to the cooling and condensing portions of the apparatus. Provision is also made in the manifold 137 to allow any high-boiling by-products condensed there to escape with the spent process gas.

Tubes 131, 132 sit loosely in the seats provided. No attempt is made to confine them closely, in order to minimize the effects of thermal-mechanical strain and breakage. The deposition tube 130 also sits fairly loosely in place. However, attempt is made to make a reasonably tight seal at each end. Pure hydrogen is introduced through the tubes and ports 139 to flush the annular region between the tubes 129 and 130, to prevent deposition on the hot shield tube 129. The interior of the tube 129 is tightly sealed at least at the lower end from the annular space between 129 and 130. Port 140 is used to introduce an appropriate flush gas into the space around the heater inside the shield tube 129. If hydrogen is used, the top end of the tube 129 may be left unsealed to allow the hydrogen to leak into the annular region between tubes 129, 130. With this system, there is no trouble in maintaining pressure equality inside and outside of the hot tubes 129, 130. Other systems are feasible, but call for careful pressure control as well as flush gas control, to avoid pressure distortion of the exceedingly hot tubes 129, 130.

All metallic pieces of the apparatus, such as end-plates 145, 141, the manifold 137, and pieces 142, 143 which either normally or accidentally may come in contact with the process gases must be made of 316 stainless steel or even more corrosion resistant alloys such as Hastelloy B. Such pieces as the end-plates 145, 141 must have provision (not shown) for water cooling.

If standard Pyrex pipe is used for the outer container 133, standard Pyrex pipe flange assemblies 144 may be used to clamp the end-plates 145, 141 onto the ends of the pipe. Such pieces as 142 and 143 may be sealed onto the apparatus by means of suitable O-rings or gaskets. The water jacket assembly 134 is sealed in place by means of gasket assemblies or packing boxes.

Using 6 inch Pyrex pipe for the piece 133, units up to at least six feet long are feasible. As much as 20 pounds of silicon can be produced per run.

FIGURE 7 illustrates schematically a molecular sieve adsorption system. The so-called molecular sieve adsorbents may be used to selectively remove, in the essentially complete absence of water vapor, any gaseous hydrogen halide, i.e., HF, HCl, HBr or HI (or any gaseous mixture of the hydrogen halides) from any gaseous mixture containing the hydrogen halides and molecules of the following types: (a) those too large to enter the pores of the molecular sieve (e.g., the halides of the elements listed at the beginning of this description) or (b) those which are small enough to enter the pores of the molecular sieve but are too weakly attracted to be appreciably adsorbed (e.g., $H_2$, $He$, $O_2$, $N_2$). A very low concentration of water vapor in the gaseous mixture is essential to the operation of this invention since the presence of any appreciable concentration of water vapor will cause breakdown of the pore structure of the molecular sieve.

When the molecular sieve has become essentially saturated with hydrogen halide, i.e., when the concentration of hydrogen halide in the outlet stream has risen to some predetermined value, the hydrogen halide may be desorbed and the molecular sieve regenerated either by flushing with a dry purge gas at 200–300° C., or by heating to 200–300° C. under vacuum, or a combination of both procedures. The adsorption-desorption cycle may be repeated an indefinitely large number of times.

In the particular case of the production of silicon by reaction of trichlorosilane with hydrogen, the by-product hydrogen chloride may be selectively and completely removed from a gaseous mixture composed of hydrogen chloride, trichlorosilane and hydrogen by adsorption on Linde molecular sieve type "5A." Any of the physical forms in which the molecular sieve is available are suitable. The pellet form is the most useful for the batch type operation, described below, while the fine powder form is more suitable for a continuous adsorption and regeneration cycle similar to systems used with fluidized catalysts. Besides the Linde molecular sieve, other natural or synthetic molecular sieve adsorbents of suitable pore dimensions may also be used.

From a gaseous mixture composed of 2–6% $SiHCl_3$, 2–4% HCl and 90–96% hydrogen, Linde molecular sieve, type 5A, 1/16" pellets, will adsorb, at room temperature and pressure, an amount of HCl equal to about 3–4% of its own weight before the hydrogen chloride concentration in the outlet stream reaches any significant value. Only a small amount (approximately 1% of the weight of adsorbent) of trichlorosilane is absorbed. Fresh, unused molecular sieves will adsorb 8–12% HCl by weight; however, on repeated cycling, this value drops to the 3–4% figure stated above. Approximately 100 pounds of aged molecular sieve are required to adsorb the hydrogen chloride produced during the deposition of one pound of silicon metal. Since the equilibrium adsorption isotherm for the adsorption of hydrogen chloride rises sharply from zero (at zero hydrogen chloride pressure) to a relatively constant value, near 4 mm. Hg hydrogen chloride pressure, the amount of hydrogen chloride adsorbed by a given amount of molecular sieve is relatively insensitive to the hydrogen chloride concentration, at least in the range of concentrations encountered in this process.

FIGURE 7 shows in simplified form one possible fixed bed type molecular sieve adsorption unit for use in the silicon deposition equipment, described elsewhere in this application. Two columns, 107 and 108, filled with molecular sieve adsorbent, are used alternately, one column receiving process gas, while the other column is either being regenerated or is on stand-by. For example, in the diagram, the process gas stream consisting of a mixture of trichlorosilane or similar silicon chlorides, hydrogen chloride, and hydrogen enters column 107 through line 105, selector valve 101, and line 110. The hydrogen chloride is selectively adsorbed in the column and the mixture, now essentially free of hydrogen chloride, passes out of the column and back into the process stream through line 111, selector valve 102, and line 106. At the same time that column 107 is on-stream, column 108 may be regenerated either by (a) flushing with purge gas into the column through line 104, selector valve 101 and line 109 and out of the column through line 112, selector valve 102 and exhaust line 103, or (b) connecting the column to a vacuum system through line 103, selector valve 102 and line 112, with line 109 closed off by valve means (not shown).

Column 108 may be placed in the process stream and column 107 in the regeneration system merely by turning selector plug valves 101 and 102 through 90 degrees.

Also included in the molecular sieve adsorption unit, but not shown in the simplified diagram are (1) suitable valves and a flowmeter for the purge gas, (2) the vacuum system, (3) means for heating the molecular sieve during regeneration and cooling after regeneration and (4) other engineering details not deemed necessary for an understanding of this invention.

Recovery of silicon deposited on quartz tubes will now be described. After the silicon has been deposited on the hot quartz surface, a separation of the silicon from the quartz must be effected. A simple method of accomplishing this is to dissolve the quartz away from the silicon in hydrofluoric acid. Hydrofluoric acid of A.C.S. reagent grade, 48% concentration, may be used. Polyethylene may be used for the containers as well as other materials of construction, such as hard rubber, which are resistant to the action of the hydrofluoric acid. When the quartz has been completely dissolved, the silicon may be washed with distilled water and dried. The silicon can then be used without further treatment, or may be made more uniform in composition by size reduction and mixing, or by melting in an inert atmosphere or under vacuum, followed by casting into ingots in quartz or other crucibles, or by "pelletizing" in a shot-tower type arrangement.

There is shown in FIGURES 8 to 11 inclusive a further embodiment of the present invention. As illustrated in these figures, the process consists of three parts which cooperate in converting silicon tetrachloride into a quantity of ultra pure silicon. The first part of the process consists of a purification of the silicon tetrachloride, the second part of the process consists of a conversion of this purified silicon tetrachloride to ultra pure silicon, in a particularly efficient manner, and a third part consists in removing the silicon from the apparatus and melting it down into ingot form.

The first step in the process has novelty in and of itself, as well as in combination with other steps of the process, in that it provides a particularly efficacious way of purifying silicon tetrachloride and removing therefrom the last traces of the most bothersome impurities. The second step of the process also has novelty in and of itself, and, in fact, is the heart of this further process embodiment of the invention. This second step in the process provides a highly efficient cyclic method of separating the chlorine out of the silicon tetrachloride, and at the same time avoiding the contamination of the resultant silicon with any of the other contaminants that are likely to be present in the silicon tetrachloride or introduced in the process. The third step in the process consists in removing the ultra pure silicon from the receptacle, usually a quartz or silicon dioxide tube, in which it is deposited; and melting the silicon down into ingots or the like.

The first step of this further process embodiment consists, first, of mixing the silicon tetrachloride to be purified with a solvent, preferably dichloromethane, trichloromonofluoromethane, or trichlorotrifluoroethane, and then passing the solvent-silicon tetrachloride mixture through an adsorption column filled with activated alumina. The solvent may thereafter be fractionated off and reused. The impurities in the silicon tetrachloride, particularly the ones that are likely to be electrically significant in the end-product ultra pure silicon, are adsorbed upon the activated alumina. Silicon tetrachloride, being non-polar in nature, is not strongly adsorbed, but impurities such as boron trichloride and phosphorus trichloride, being polar in nature, are quite completely adsorbed. Following this adsorption phase of the purification process, the product silicon tetrachloride is fractionally distilled to remove traces of solvents, residual impurities, and those impurities introduced during the adsorption step. The impurities most difficult to remove by distillation are for the most part those most readily removed by the adsorption technique, and those not removed or introduced by the adsorption technique are generally easily removed by fractional distillation. Thus the product from the combined adsorption-distillation process possesses an exceedingly high degree of purity.

The second step in the process consists in passing a mixture of silicon tetrachloride and hydrogen through a heated zone, in which reaction takes place to form silicon and hydrogen chloride. This reaction is incomplete, but that fact does not make the over-all process incomplete, because silicon tetrachloride is subsequently added to the mixture flowing out of the reaction zone so as to make up for that decomposed in the reaction zone, the hydrogen chloride is removed and make-up hydrogen added or formed in the mixture and the mixture is recycled to the reaction zone. By using zinc vapor to split the hydrogen chloride in the effluent from the reaction zone, and thus to reconstitute the hydrogen in the mixture and form zinc chloride as a by-product, it is possible to perform a purification step at the same time that the mixture is being brought back to its proper proportions of silicon tetrachloride and hydrogen. The formation of the zinc chloride and its subsequent removal by settling and filtration through some material such as glass wool, tends also to remove incidental impurities from the mixture, and thus to avoid contamination of the final product. The unsued silicon tetrachloride and hydrogen being recycled add no new impurities, and this tends to simplify the matter of keeping the system uncontaminated.

The third and final step is performed periodically, rather than continuously, and consists in removing the surface on which the silicon is deposited in the reaction zone, and the removal of the silicon from this surface. Usually, a fused quartz or other tube which is almost pure silicon dioxide is used for this purpose, and generally, it will be necessary to break that tube to recover the silicon. Any quartz that cannot readily be separated from the silicon may be leached therefrom with hydrofluoric acid. The silicon may thereafter be melted down into ingots or some other convenient form.

As illustrated in FIGURE 8, silicon tetrachloride, generally of reagent quality, although not ultra purified at this point in the process, is fed first into an adsorption and distillation apparatus which purifies the silicon tetrachloride and removes such impurities therefrom as might later be detrimental to the process or to the final product. From this purification apparatus, the silicon tetrachloride passes to a cyclic silicon deposition step, to which zinc metal also is introduced, and in this part of the process, the silicon is separated from the silicon tetrachloride and deposited in a highly purified form, usually in a fused quartz (silicon dioxide) tube. From this part of the process, zinc chloride results as a by-product and highly purified silicon is removed, usually encased in the quartz or silicon dioxide tube in which it was deposited. In the final step of the process, the quartz tube is removed from the silicon, and the silicon is melted down under conditions carefully controlled to prevent contamination, and formed into ingots or other suitable form for further use.

The adsorption and distillation process is preferably performed in apparatus of the type shown in FIGURE 9. This apparatus may be of fused quartz to improve the purity of the product, but does not necessarily have to be so. The silicon tetrachloride is placed in the reservoir 210 of a separatory funnel and passes downwardly through a stopcock 211 of this funnel and into a receiver 212, positioned therebelow. A fitting 213 between the stopcock 211 and the receiver 212 provides an entrance for solvent, such as dichloromethane, trichloromonofluoromethane or trichlorotrifluoroethane, which mixes with the silicon tetrachloride in the receiver 212, and the two then pass downwardly through three-way stopcock 214 into an adsorption column 215, which is filled with activated aluminum oxide, which tends to adsorb the undesired impurities from the silicon tetrachloride.

Silicon tetrachloride has a symmetrical molecule with no electrical dipole moment and with a stable electronic structure which shows little or no tendency to make additional chemical bonds. By contrast, such critical impurities as boron trichloride and phosphorus trichloride have unsymmetrical structures which have appreciable dipole moments, and these compounds have strong tendencies to form additional chemical bonds. Thus such impurities are attracted to and held by the active surfaces of the aluminum oxide while the silicon chloride passes on through.

At the lower end of the absorption column 215, there is located a three-necked flask 216, heated by an electrical heating mantle 217 connected to a suitable source of power (not shown) through leads 218. The flask contains a few chips of quartz to prevent violence to the boiling. As the adsorption purification process proceeds, the solution of silicon tetrachloride in a solvent such as one of those named above enters the flask 216 from the adsorption column 215. To maintain a reasonably constant volume of liquid in the flask 216, and to provide a source of solvent at point 213 to mix with the silicon tetrachloride in receiver 212, power is applied to the heating mantle 217 to cause the solution in flask 216 to boil. Since the solvent is chosen so that it has a significantly lower boiling point than that of silicon tetrachloride, the vapor thus produced is composed essentially of the pure solvent. This vapor is conducted along vapor return tube 220 to a condenser system where condensers 221 and 222 are provided to liquify the solvent vapors. The condensed solvent discharges into the tube 213 and thence into receiver 212, thus completing the solvent cycle. At the end of a run, when the activated alumina column has become saturated with impurities or the available volume of silicon tetrachloride has been purified, the stopcock 211 is turned off. Recycling of the solvent is continued long enough to wash all the free silicon tetrachloride off of the column 215. Then, the stopcock 214 is turned to the solvent recovery position and the condensing solvent is recovered in flask 224. Solvent recovery is continued until the thermometer 219 indicates that separation of the solvent from the silicon tetrachloride in the flask 216 is essentially complete.

In starting up the system, solvent is placed in the flask 216 and boiling begun to set the solvent cycle into operation. Then, silicon tetrachloride can be added as described above and the purification process begun.

The acid adsorption tubes 223, 225 are provided to allow venting the apparatus to the atmosphere without permitting noxious acid gases to escape.

The silicon tetrachloride that remains in the flask after most of the solvent has been boiled off is transferred to a fractionating column (not shown) and there separated from the remaining solvent and residual impurities. This fractionating column may be a batch-type unit or may be similar to the system of FIGURE 2. The purified silicon tetrachloride is stored in appropriate containers until it is used in the next step of the process.

The purified silicon tetrachloride is used in the second step of the process as illustrated in FIGURES 10 and 11. A mixture of silicon tetrachloride, hydrogen, and hydrogen chloride continuously emerges from the silicon deposition tube 231. To this is added enough silicon tetrachloride from a silicon tetrachloride reservoir 230, to make up for that used in the deposition tube. The silicon tetrachloride may be added as a pure liquid, in which case it is rapidly converted to a gas and taken up by the hot process gases; or it may be added as a vapor from a boiler, or part of the process gas may be bubbled through the liquid silicon tetrachloride to vaporize it and carry it into the process. The process gas mixture, now enriched in silicon tetrachloride, passes to the zinc reaction tube 232, where it is mixed with zinc vapors from a zinc boiler 233, which is maintained at around 900° C. to around 1100° C. The zinc reaction tube itself is maintained at a temperature of around 600° C. to around 800° C. In this reaction tube, the zinc vapors combine with the hydrogen chloride to form zinc chloride and hydrogen. The silicon tetrachloride, zinc chloride, and hydrogen then pass on to a cooling and settling chamber 234, in which most of the zinc chloride and other impurities are removed, leaving essentially only silicon tetrachloride, hydrogen, and a small amount of residual hydrogen chloride to pass on to the filter 235. This filter is preferably a glass wool or similar filter, and any residual zinc chloride or other solid impurities are removed here. The filtered process gas then passes from the filter 235 to the pump 236 and then back to the silicon deposition tube 231, which is heated to from around 1100° C. to around 1300° C., and here a portion of the hydrogen reacts with a portion of the silicon tetrachloride to form hydrogen chloride and elemental silicon, which deposits out on the heated tube. The initial hydrogen charge used in the process, as well as any hydrogen required for make-up purposes, is introduced by line 238 into the system ahead of the zinc reaction tube 232. The silicon deposition tube 231 is part of a silicon deposition assembly such as those shown in FIGURES 5 and 6. The silicon deposition tube is normally made of fused quartz ($SiO_2$). The output of the silicon deposition tube 231 then proceeds toward zinc reaction tube 232 and is mixed with make-up silicon tetrachloride, as already pointed out.

In order that there be no contamination problem and that the tube be such as will stand the necessary temperature, it has been found preferable to use silica (fused quartz) or "Vycor" for the zinc reaction tube 232 and the zinc boiler 233. "Vycor" is Corning 96% silica glass No. 7900.

The preferred temperature for the deposition tube is 1200° C., for the zinc boiler 1050° C., and for the zinc reaction tube 650° C.

Appropriate analytical equipment 237 may be attached to the tubing connecting the pump 236 and the silicon deposition tube 231, so as to either continuously or intermittently receive and analyze a sample of the gases passing to the deposition tube, for control purposes. Preferably, an infra-red analysis unit and a thermal conductivity cell are used for this analysis, so that both silicon chloride and residual hydrogen chloride concentrations can be determined.

Instead of removing the hydrogen chloride by the use of zinc, and thus forming additional hydrogen at the same time, the hydrogen chloride may be removed by absorption on zeolites (including the Linde molecular sieves discussed above), and additional hydrogen added to make up for that used in the process.

Referring to FIGURE 11, it will be seen that the parts are illustrated in diagrammatic form and are shown as encased in a cover 240 which is provided with an opening 241, to which an exhaust fan may be connected so as to carry away any fumes that may escape. The details of the analysis and control panel 242 have not been shown, since they are not a part of this invention and can be varied to suit the occasion.

A typical composition of the gas entering the silicon deposition tube 231 is 5 percent silicon tetrachloride, approximately 0.06 percent hydrogen chloride, and the remainder hydrogen. The silicon tetrachloride content of this gas may well vary between 2 and 10 percent, and preferably, the hydrogen chloride content of this gas is as low as possible. The process, however, will operate satisfactorily with a somewhat higher hydrogen chloride content, for example, up to about 0.5 percent.

A typical composition for the gases leaving the silicon deposition tube 231 would be 4.5 percent silicon tetrachloride, approximately 2 percent hydrogen chloride, and the remainder hydrogen. Again, the percentage of silicon tetrachloride may vary from about 2 to 10 percent, always being a little lower than the percentage at the input to the silicon deposition tube, by reason of the deposition of silicon therein, and a similar variation in the percent of hydrogen chloride in the exit gas may be noted.

One of the most important features of this embodiment of the invention is that of feeding the silicon tetrachloride into the system just ahead of the zinc reactor. As a result, the silicon tetrachloride is purified by passage through the hot zinc vapor before it reaches the deposition tube. Impurities tend either to be removed by the zinc, or to be quite resistant to deposition in the silicon chamber. Therefore the zinc vapor, in addition to its primary function of regenerating the hydrogen, also continuously purifies both the incoming silicon tetrachloride and the recycling gas stream. In experimental runs, both prepurified silicon tetrachloride and raw, undistilled silicon tetrachloride gave high purity silicon when the silicon was deposited according to this process. Thus, while the prepurification process is highly desirable, the silicon deposition step may be operated alone to produce silicon that is quite satisfactory for many purposes.

Besides the inherent self-purification feature, this system has the advantage of complete consumption of the silicon tetrachloride fed into it, and of requiring very little in the way of gas purification and disposal or recovery facilities.

The silicon is normally deposited on the inside of a quartz tube. While in some cases, the silicon has shown a tendency to come loose without breaking the quartz tube, the quartz tube in most instances has had to be destroyed in the process, but this presents no particular problem. Some of the quartz often tends to remain with the silicon but this may be leached away with hydrofluoric acid.

Either of the two particular embodiments of this invention which have been described above may be used to make high purity silicon. In addition, different features of the two processes may be combined to produce still other processes. For example, whether the starting material is trichlorosilane or silicon tetrachloride is relatively unimportant, since the available evidence indicates that the silicon tetrachloride is converted in high yield to trichlorosilane during the first pass through the hot reduction tube, and that both are converted in part to a complex mixture of silicon hydride-halides (partially reduced silicon chlorides) during passage through the hot deposition tube in the hydrogen atmosphere. So in the recycle process, the composition of the gas stream entering the deposition unit will be much the same regardless of which compound is used as a starting material. Thus the starting material has been found not to be uniquely critical although the use of trichlorosilane is preferred.

The same processes can be used to produce other elements, such as boron, when a mixture of a volatile halide (such as $BCl_3$) and hydrogen is passed through a hot tube and the reduction reaction is not complete in a single pass. Further, the processes may be used to produce compounds by recycling a mixture in hydrogen gas of volatile halides of two or more different elements, or a mixture in hydrogen gas of a volatile halide containing both elements. An example of the first compound production instance is the production of aluminum phosphide using a mixture of aluminum and phosphorus trichlorides. An example of the second instance is the production of aluminum phosphide from the complex compound $AlCl_3 \cdot PH_3$.

The process of this invention has been described in terms of two primary embodiments and, further, as process embodiments for the production of ultra pure silicon. However, it should be recognized that elements and compounds other than silicon may be produced by the process of this invention and that numerous changes, modifications, substitutions and deviations may be made without departing materially from the process described above. Accordingly, all embodiments coming within the scope of the claims appended hereto are intended to be claimed as within and part of this invention.

What is claimed is:

1. A method of converting a volatilizable halide containing at least one element selected of the group consisting of metals and metalloids in combination with a halogen into a highly purified elemental state of said at least one element which comprises passing a gaseous mixture of said halide and hydrogen into a first reaction zone maintained at a temperature sufficient to cause substantial reaction to take place, with the consequent deposition of said at least one element in the first reaction zone and formation of hydrogen halide, removing from the first reaction zone a mixture of the unreacted halide, hydrogen and the hydrogen halide, mixing zinc vapor with said mixture in a second reaction zone to reduce preferentially the hydrogen halide formed by the reaction in the first reaction zone, removing the zinc compound formed in the second reaction zone, replacing the hydrogen utilized in the first reaction zone, and recirculating the resultant mixture of hydrogen and unreacted volatilizable halide through said first reaction zone.

2. The method as defined in claim 1 wherein the second reaction zone is maintained at a temperature of approximately 600° C. to approximately 800° C.

3. The method as defined in claim 1 wherein the said at least one element is silicon and the temperature of the first reaction zone is maintained at approximately 1100° C. to approximately 1300° C.

4. The method as defined in claim 1 wherein sufficient volatilizable halide to replace reacted volatilizable halide is introduced into the second reaction zone.

5. A method of converting a chloride of silicon into a highly purified silicon that comprises passing a mixture of the chloride of silicon and hydrogen into a first reaction zone maintained at a temperature sufficient to cause substantial reaction to take place, with consequent deposition of silicon and the formation of hydrogen chloride, removing from the first reaction zone a mixture of the unreacted chloride of silicon and hydrogen and hydrogen chloride formed in the first reaction zone, mixing zinc vapor with said mixture in a second reaction zone to reduce preferentially the hydrogen chloride formed in said first reaction zone, removing the zinc chloride compound formed in said second reaction zone, replacing the chloride of silicon and the hydrogen utilized in the first reaction zone, and recirculating the resulting mixture through the first reaction zone.

6. The method as defined in claim 5 in which the first reaction zone is maintained at a temperature of approximately 1100° C. to approximately 1300° C.

7. The method as defined in claim 6 in which the second reaction zone is maintained at a temperature of approximately 600° C. to approximately 800° C.

8. A method of converting a chloride of silicon into a highly purified silicon that comprises passing a mixture of the chloride of silicon and hydrogen into a high temperature reaction zone maintained at a temperature sufficient to cause substantial reaction to take place, with consequent deposition of silicon in the reaction zone and the formation of hydrogen chloride, removing from the reaction zone the unreacted chloride of silicon and hydrogen and hydrogen chloride formed in the reaction zone, passing the said unreacted chloride of silicon and hydrogen and hydrogen chloride formed in the first reaction zone through a molecular-sieve zeolite to remove selectively hydrogen chloride from the mixture of the unreacted chloride of silicon and hydrogen and the hydrogen chloride formed in the first reaction zone, replacing the chloride of silicon and hydrogen utilized in the reaction zone and recirculating the resulting mixture through the reaction zone.

9. The method as defined in claim 8 wherein the chloride of silicon is trichlorosilane.

10. The method as defined in claim 8 wherein the chloride of silicon is silicon tetrachloride.

References Cited in the file of this patent

UNITED STATES PATENTS

| | | |
|---|---|---|
| 1,046,043 | Weintraub | Dec. 3, 1912 |
| 2,142,694 | Maier | Jan. 3, 1939 |
| 2,438,892 | Becker | Apr. 6, 1948 |
| 2,441,603 | Storks et al. | May 18, 1948 |
| 2,766,112 | Schafer | Oct. 9, 1956 |
| 2,773,745 | Bulter et al. | Dec. 11, 1956 |

OTHER REFERENCES

Fiat Final Report 789 "Experiments to Produce Ductile Silicon," pages 1–5, April 1946.

Chemical Abstracts, vol. 17 (1923), page 3651[5].

Jacobson: "Encyclopedia of Chemical Reactions," vol. II, p. 701 (1948).

Barrer: J. Soc. Chem, Ind., May 1945, vol. 64, pages 130–135.